(12) United States Patent
Ho

(10) Patent No.: US 7,573,700 B2
(45) Date of Patent: Aug. 11, 2009

(54) SUPPORT MECHANISM AND ELECTRONIC DEVICE UTILIZING THE SAME

(75) Inventor: Han-Kuang Ho, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 601 days.

(21) Appl. No.: 11/296,885

(22) Filed: Dec. 7, 2005

(65) Prior Publication Data

US 2006/0126283 A1   Jun. 15, 2006

(30) Foreign Application Priority Data

Dec. 13, 2004  (TW) .............................. 93138575 A

(51) Int. Cl.
*H05K 7/00* (2006.01)
(52) U.S. Cl. ...................... 361/679; 248/917
(58) Field of Classification Search ................ 361/681, 361/679.21; 248/917
See application file for complete search history.

(56) References Cited

U.S. PATENT DOCUMENTS 5,710,415 A   1/1998   Kono et al.
6,193,546 B1 *   2/2001   Sadler .......................... 439/534
6,367,756 B1 *   4/2002   Wang ........................ 248/278.1
6,510,049 B2 *   1/2003   Rosen .................... 361/679.07

FOREIGN PATENT DOCUMENTS

CN   2473716 Y   1/2002

* cited by examiner

*Primary Examiner*—Jayprakash N Gandhi
*Assistant Examiner*—Ingrid Wright

(57) ABSTRACT

An electronic device and a support mechanism thereof. The electronic device includes a body, a rotatable member, a support, a friction member, and a base. The rotatable member is disposed on the body. The support is combined with the rotatable member. The rotatable member rotates with respect to the support. The friction member is combined with the rotatable member, and has a first circular arc surface. The base is combined with the friction member, and has a second circular arc surface corresponding to the first circular arc surface. The support is disposed on the base. The first circular arc surface slidably abuts the second circular arc surface.

20 Claims, 11 Drawing Sheets

SUPPORT MECHANISM AND ELECTRONIC DEVICE UTILIZING THE SAME

BACKGROUND

The invention relates to an electronic device, and in particular, to an electronic device with a support mechanism to adjust a body without a hinge.

In a liquid crystal display, a screen angle is typically adjusted by a hinge. Since the hinge is manufactured by a specialized factory to obtain a required torque, mass production is difficult, thus increasing cost.

SUMMARY

An electronic device with a support mechanism to adjust a body without a hinge is provided. An exemplary embodiment of an electronic device comprises a body, a rotatable member, a support, a friction member, and a base. The rotatable member is disposed on the body. The support is combined with the rotatable member. The rotatable member rotates with respect to the support. The friction member is combined with the rotatable member, and comprises a first circular arc surface. The base is combined with the friction member, and comprises a second circular arc surface corresponding to the first circular arc surface. The support is disposed on the base. The first circular arc surface slidably abuts the second circular arc surface. The body is kept at a predetermined position by friction generated by the first circular arc surface abutting the second circular arc surface.

The electronic device further comprises a combining member, a pad, and a rotary shaft. The combining member combines the base and the friction member so that the first circular arc surface closely abuts the second circular arc surface. The combining member is a screw passing through the base to be combined with the friction member. The base comprises a slot in which the screw is moveable. The pad is located between the combining member and the base. The rotary shaft combines the support and the rotatable member. The rotatable member comprises a first through hole. The support comprises a second through hole corresponding to the first through hole. The rotary shaft passes through the first and second through holes.

Moreover, the rotatable member comprises a hollow portion. The friction member comprises a protrusion inserted into the hollow portion to combine the rotatable member and the friction member.

The rotatable member and the body may be integrally formed into a single piece. The support and the base may also be integrally formed into a single piece. The friction member may comprise polycarbonate resin, polyethylene resin, or poly acetal resin.

Note that the electronic device may be a display, and the body may be a screen.

A support mechanism for supporting an object is provided. An exemplary embodiment of a support mechanism comprises a rotatable member, a support, a friction member, and a base. The rotatable member is disposed on the object. The support is combined with the rotatable member. The rotatable member rotates with respect to the support. The friction member is combined with the rotatable member, and comprises a first circular arc surface. The base is combined with the friction member, and comprises a second circular arc surface corresponding to the first circular arc surface. The support is disposed on the base. The first circular arc surface slidably abuts the second circular arc surface. The object is kept at a predetermined position by friction generated by the first circular arc surface abutting the second circular arc surface.

DESCRIPTION OF THE DRAWINGS

The invention can be more fully understood by reading the subsequent detailed description and examples with references made to the accompanying drawings, wherein:

FIG. 1b is a left side view of the electronic device in FIG. 1a;

FIG. 1c is a right side view of the electronic device in FIG. 1a;

FIG. 1d is a top view of the electronic device in FIG. 1a;

FIG. 1e is a cross section along a line e-e in FIG. 1a;

FIG. 2b is a left side view of the electronic device in FIG. 2a;

FIG. 2c is a cross section along a line c-c in FIG. 2a;

FIG. 3a is a perspective view of the electronic device in FIG. 1a;

FIG. 3b is a partial exploded view of the electronic device in FIG. 1a; and

DETAILED DESCRIPTION

Figure 1A:
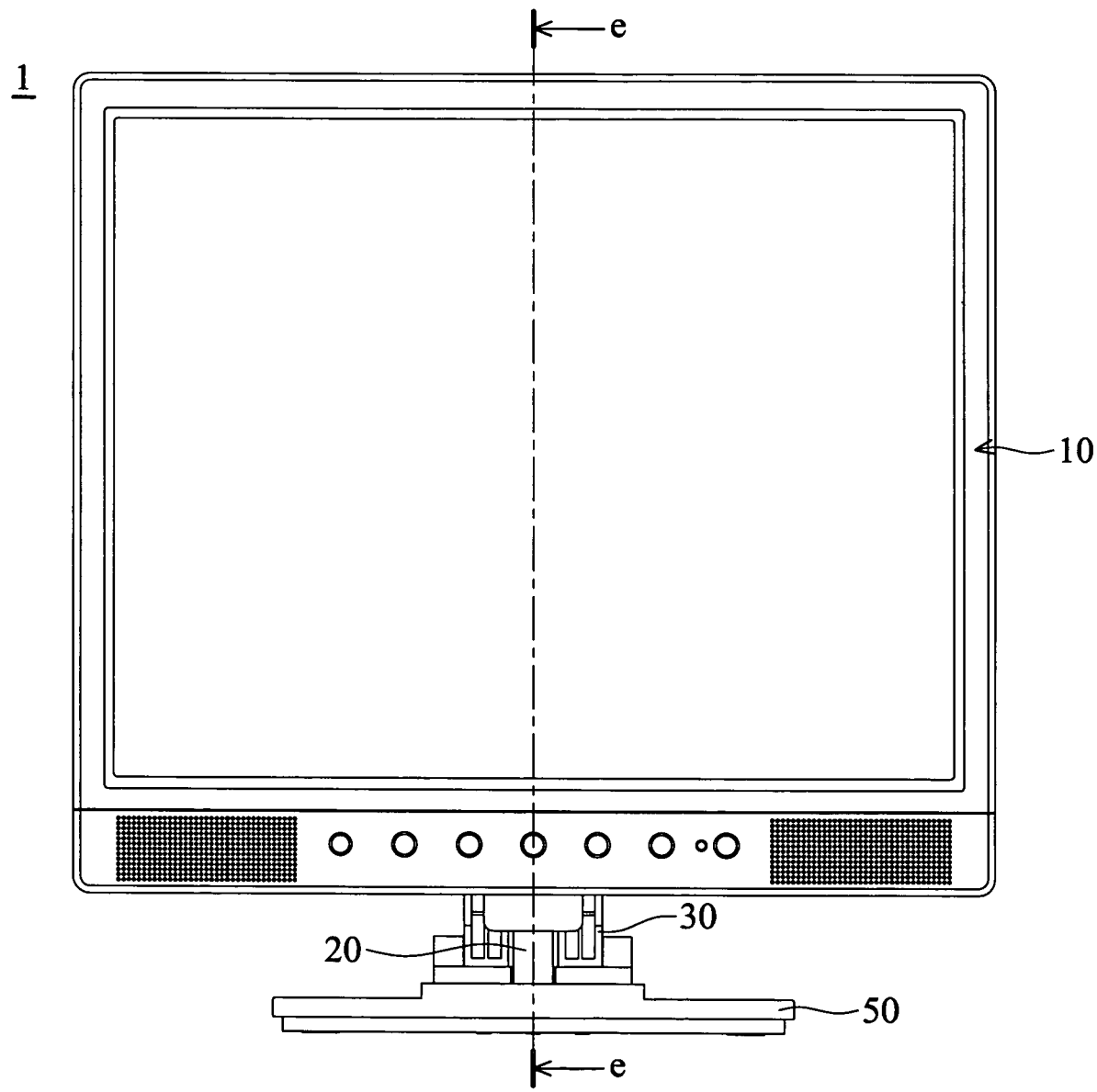
FIG. 1a is a front view of an embodiment of an electronic device, wherein a body is located in a vertical position.
Figure 1B:
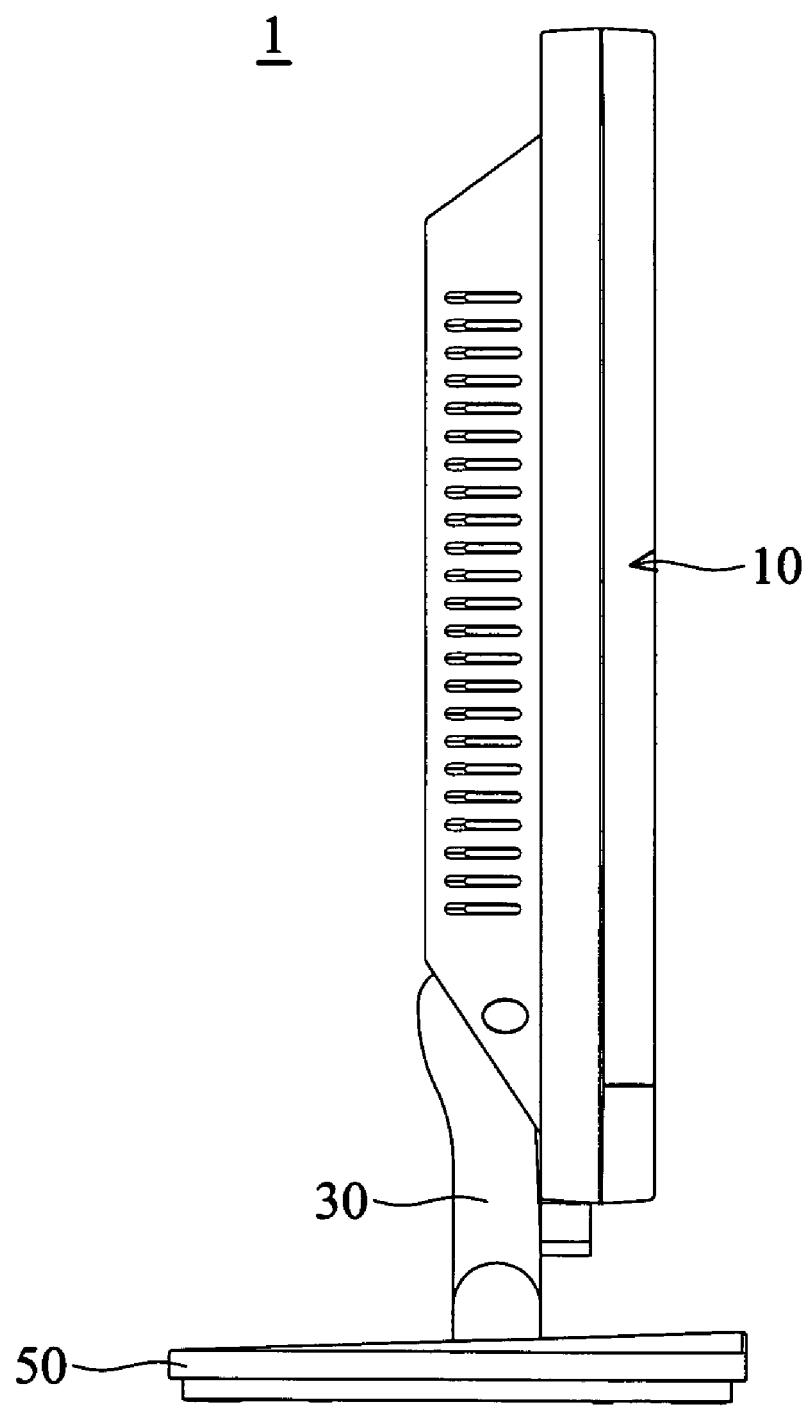

FIGS. 1a-3b depict an embodiment of an electronic device 1 comprising a body 10, a rotatable member 20, a support 30, a friction member 40, a base 50, a combining member 60, and a rotary shaft 80. The rotatable member 20, the support 30, the friction member 40, the base 50, the combining member 60, and the rotary shaft 80 substantially constitute an embodiment of a support mechanism. While the electronic device 1 and the body 10 are a display and a screen respectively in FIG. 1a, they are not limited to this. The support mechanism may be employed in other electronic devices requiring adjustability.

Figure 3A:
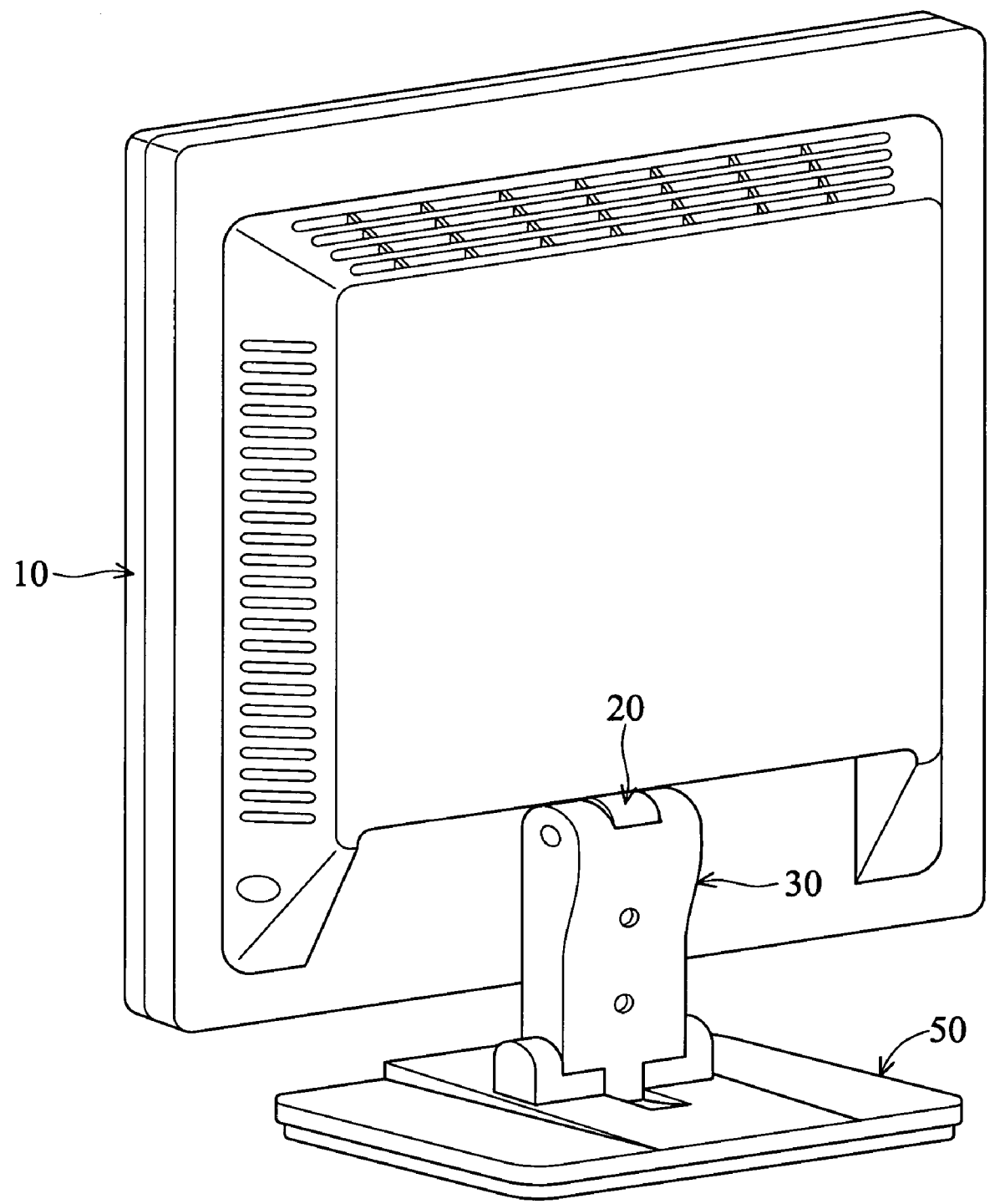
Figure 3B:
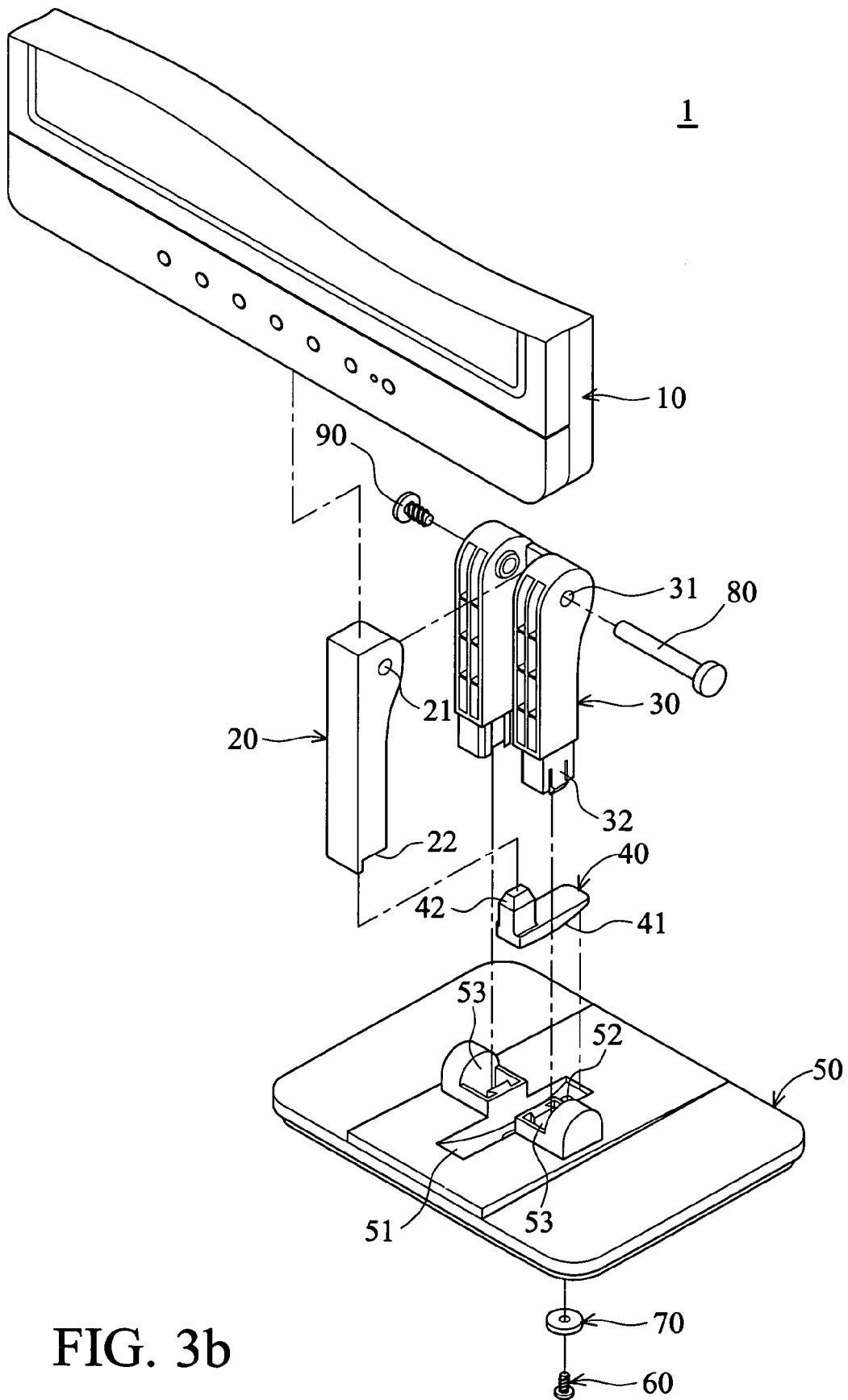
Figure 3C:
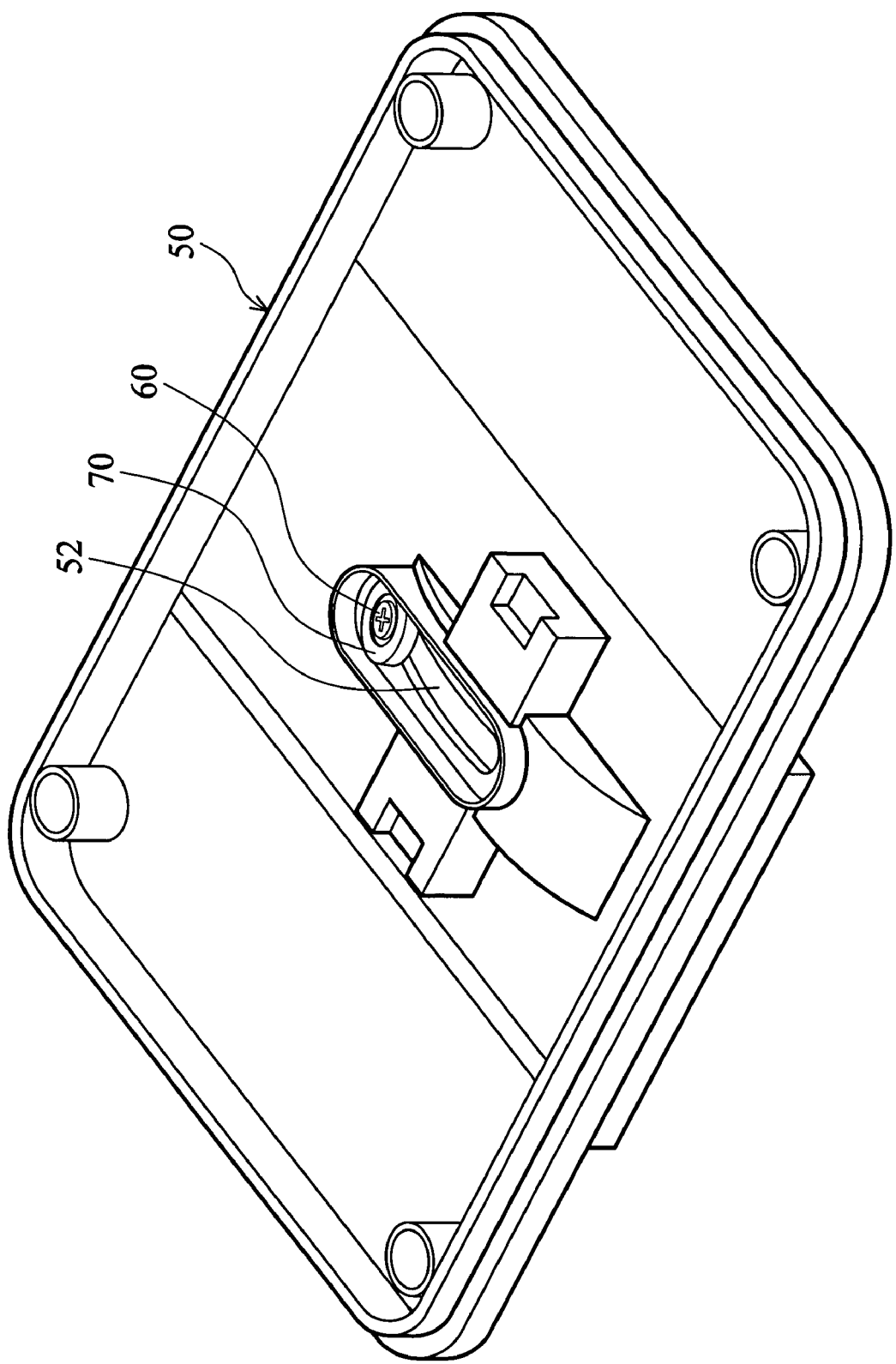
FIG. 3c is a perspective view of a base in FIG. 3b.

Referring to FIG. 3b, the rotatable member 20 is disposed on the body 10, and comprises a first through hole 21 at the upper portion thereof, through which the rotary shaft 80 is passed. The body 10 may be inclined at a predetermined angle by rotation of the rotary shaft 80. As shown in FIG. 1e, the rotatable member 20 comprises a hollow portion 22 at the bottom thereof, in which a protrusion 42 of the friction member 40 is inserted. While the rotatable member 20 is fixed to body 10 by a screw (not shown) in this embodiment, it is not limited to this. For example, the rotatable member 20 and the body 10 may be integrally formed into a single piece.

Referring to FIG. 3b, the support 30 supports the weight of the body 10, and comprises a second through hole 31, corresponding to the first through hole 21, at its upper portion. The rotary shaft 80 passes through the first and second through holes 21 and 31 to combine the support 30 and the rotatable member 20. The rotatable member 20 may rotate with respect to the support 30. The support 30 comprises two protrusions 32 inserted into receiving portions 53 of the base 50; thus, the support 30 is disposed on the base 50. While the support 30 and the base 50 are two pieces in this embodiment, they are not limited to this, and may be integrally formed into a single piece.

Referring to FIG. 3b, friction generated by the friction member 40 maintains the rotary member 20 at the predetermined angle. The friction member 40 comprises a first circular arc surface 41 at the bottom surface thereof, and a protrusion 42 at the top surface thereof. The protrusion 42 is inserted into the hollow portion 22 of the rotatable member 20 to combine the friction member 40 and the rotatable member 20. The friction member 40 may comprise polycarbonate resin, polyethylene resin, or poly acetal resin.

The base 50 serves as a bottom of the entire electronic device 1, and comprises a second circular arc surface 51, corresponding to the first circular arc surface 41, to provide a contact area for the friction member 40. The base 50 further comprises a slot 52 for restraining the inclined angle of the body 10 during the rotation of the rotatable member 20 to adjust the body 10 within a predetermined range.

The combining member 60 may be a screw passing through the slot 52 of the base 50 to be combined with the friction member 40, as shown in FIG. 1e. Thus, the first circular arc surface 41 closely abuts the second circular arc surface 51. When the combining member 60 is locked, the friction member 40 and the base 50 are clamped to generate the friction. The combining member 60 may be moveable in the slot 52 of the base 50 so that the first circular arc surface 41 slidably abuts the second circular arc surface 51. Additionally, the electronic device 1 may further comprise a pad 70 located between the combining member 60 and the base 50.

The rotary shaft 80 serves as an axis during rotation of the body 10. Referring to FIG. 3b, the rotary shaft 80 is passed through the first through hole 21 of the rotatable member 20 and the second through hole 31 of the support 30 to be combined with a screw 90 so that the support 30 is combined with the rotatable member 20.

As previously described, since the first circular arc surface 41 closely abuts the second circular arc surface 51, the friction is generated between the base 50 and the friction member 40. Thus, the body 10 may be rotated with respect to the support 30 via the rotatable member 40 by the friction between the base 50 and the friction member 40.

Figure 1C:
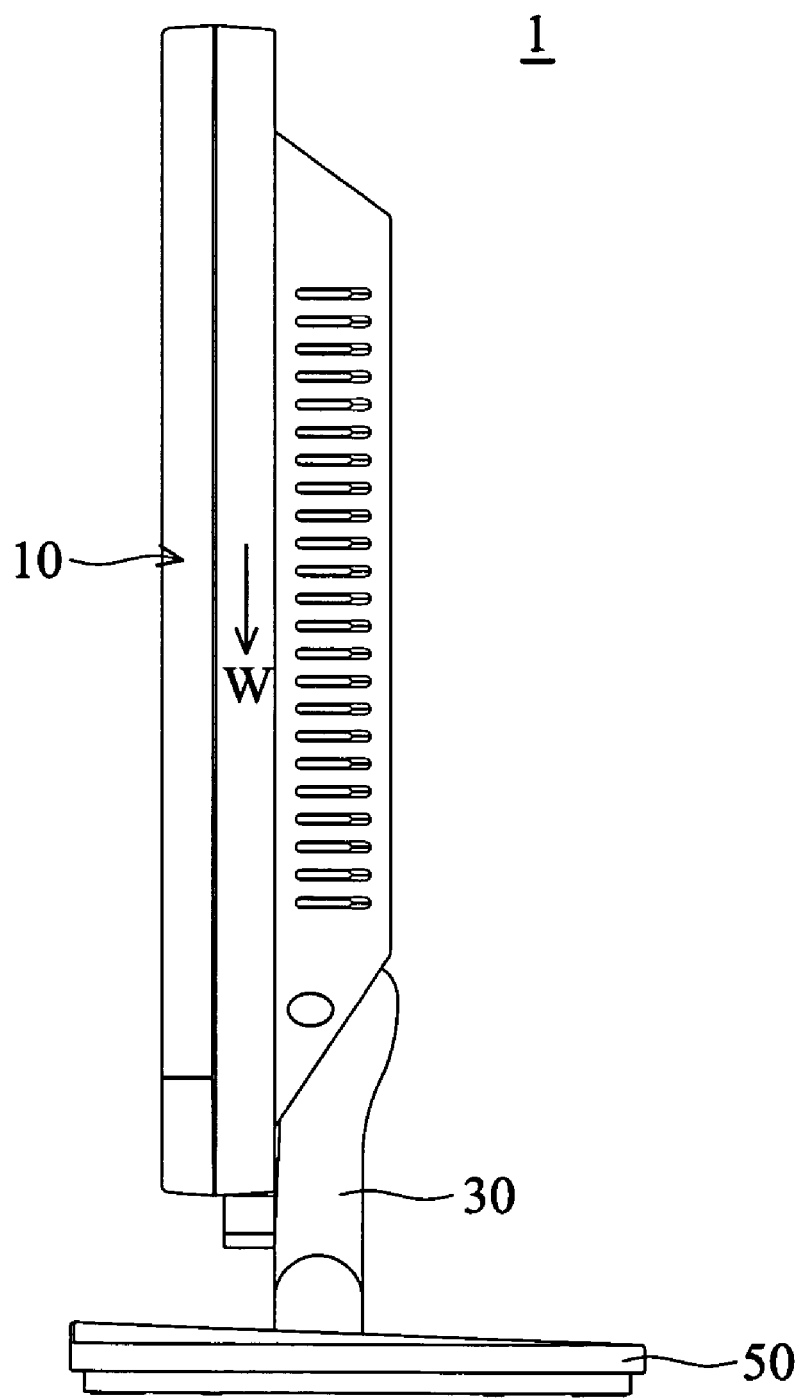
Figure 1D:
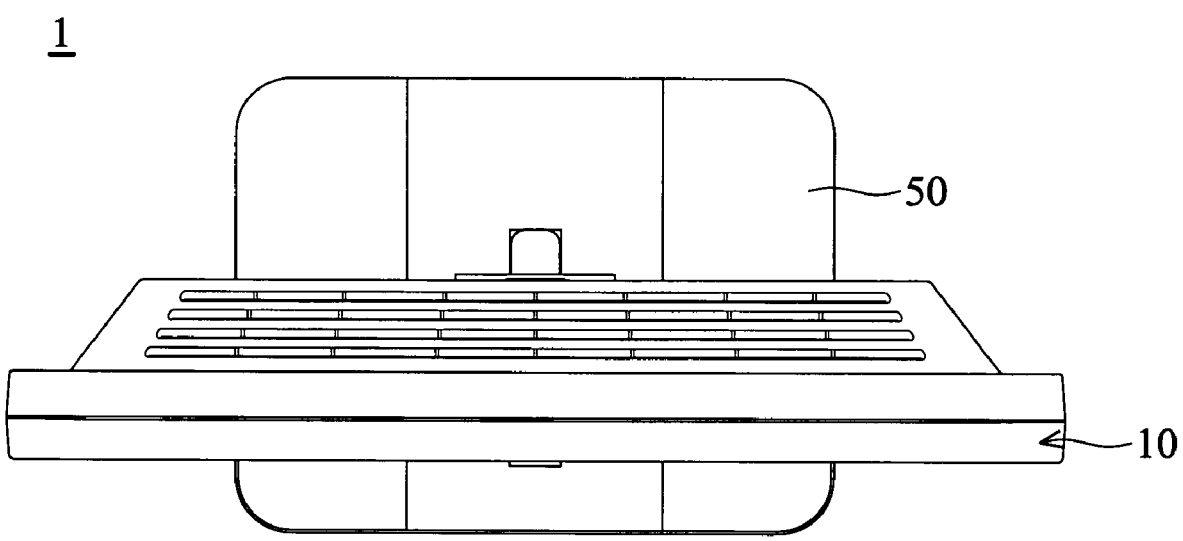
Figure 1E:
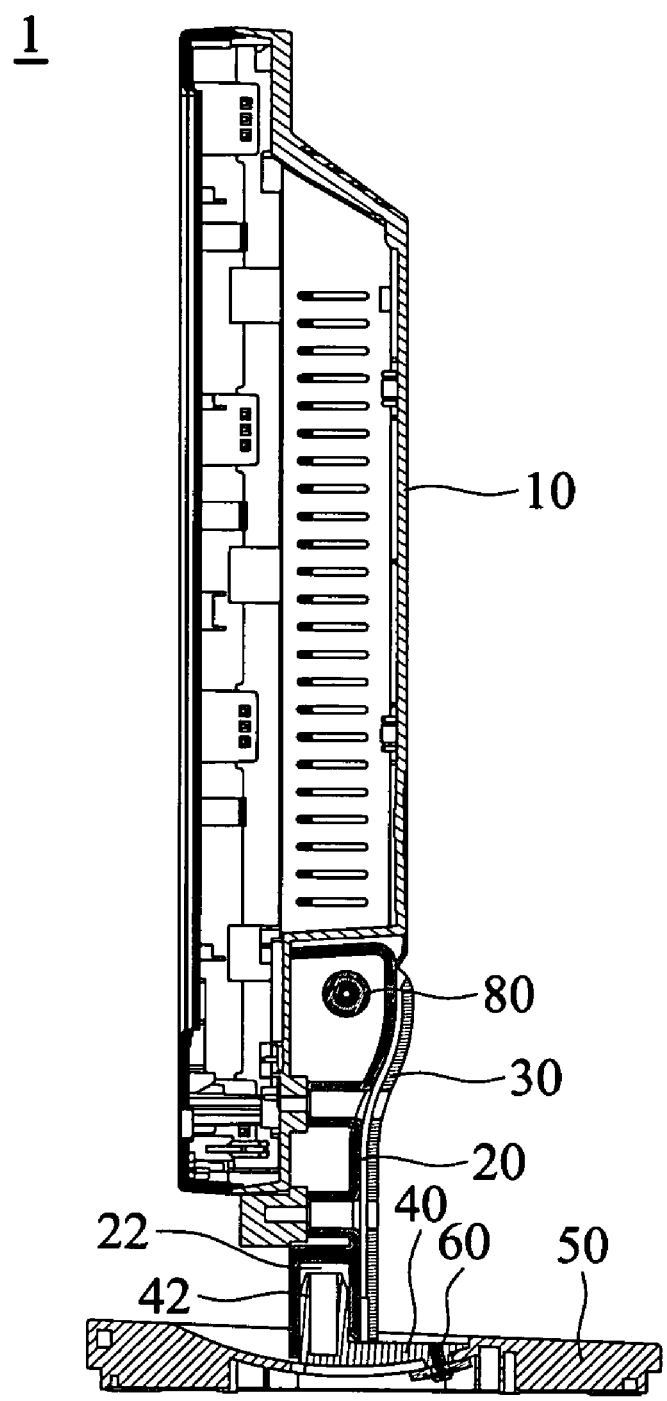

Referring to FIG. 1c, when the body 10 is located in a vertical position, only gravity (W) in the vertical direction is generated. The base 50 and the support 30 may directly sustain the gravity (W) while the friction member 40 may provide sufficient friction to fix the body 10 in the vertical position.

Figure 2A:
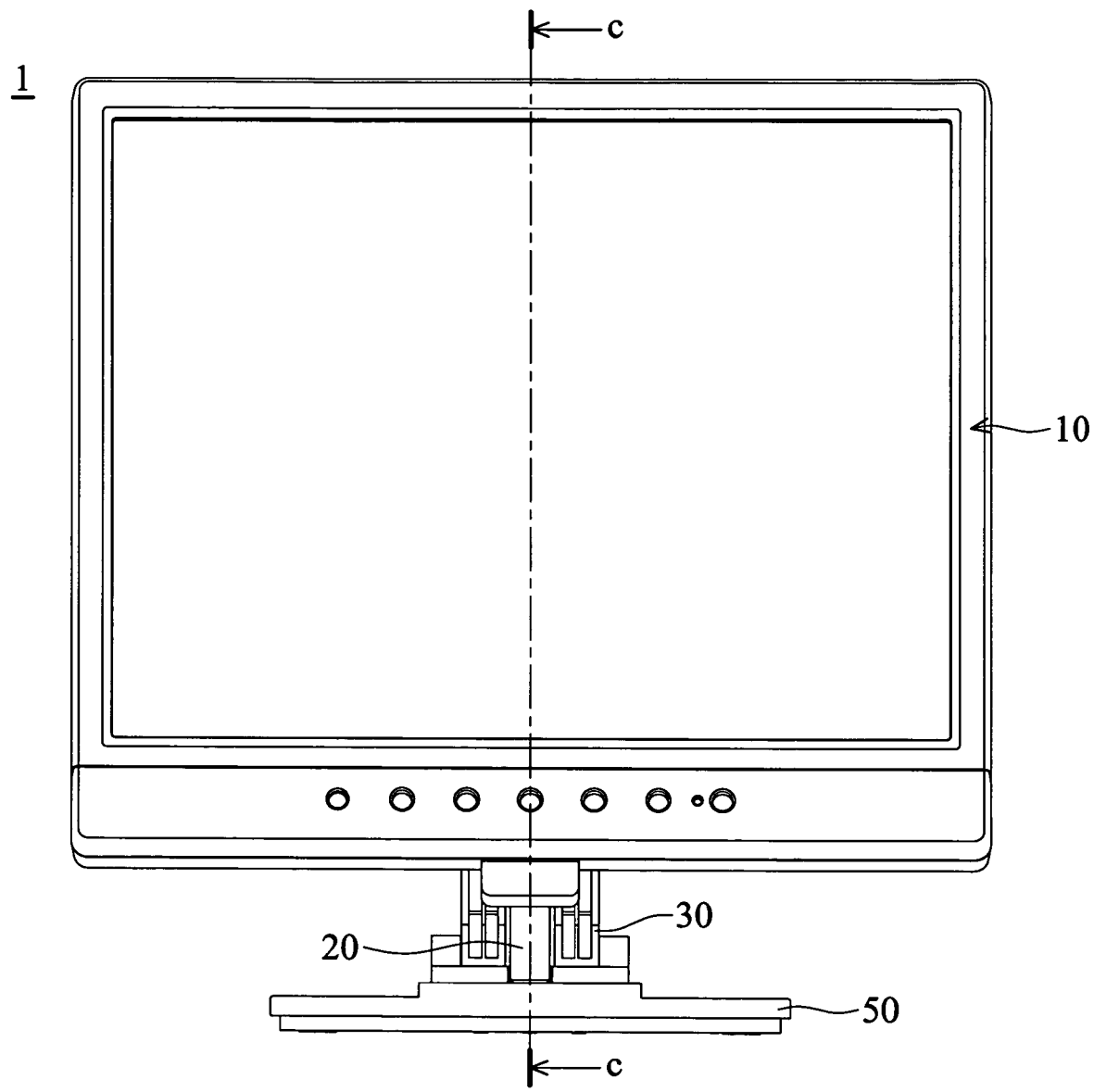
FIG. 2a is another front view of the electronic device in FIG. 1a, wherein the body is located in an inclined position.
Figure 2B:
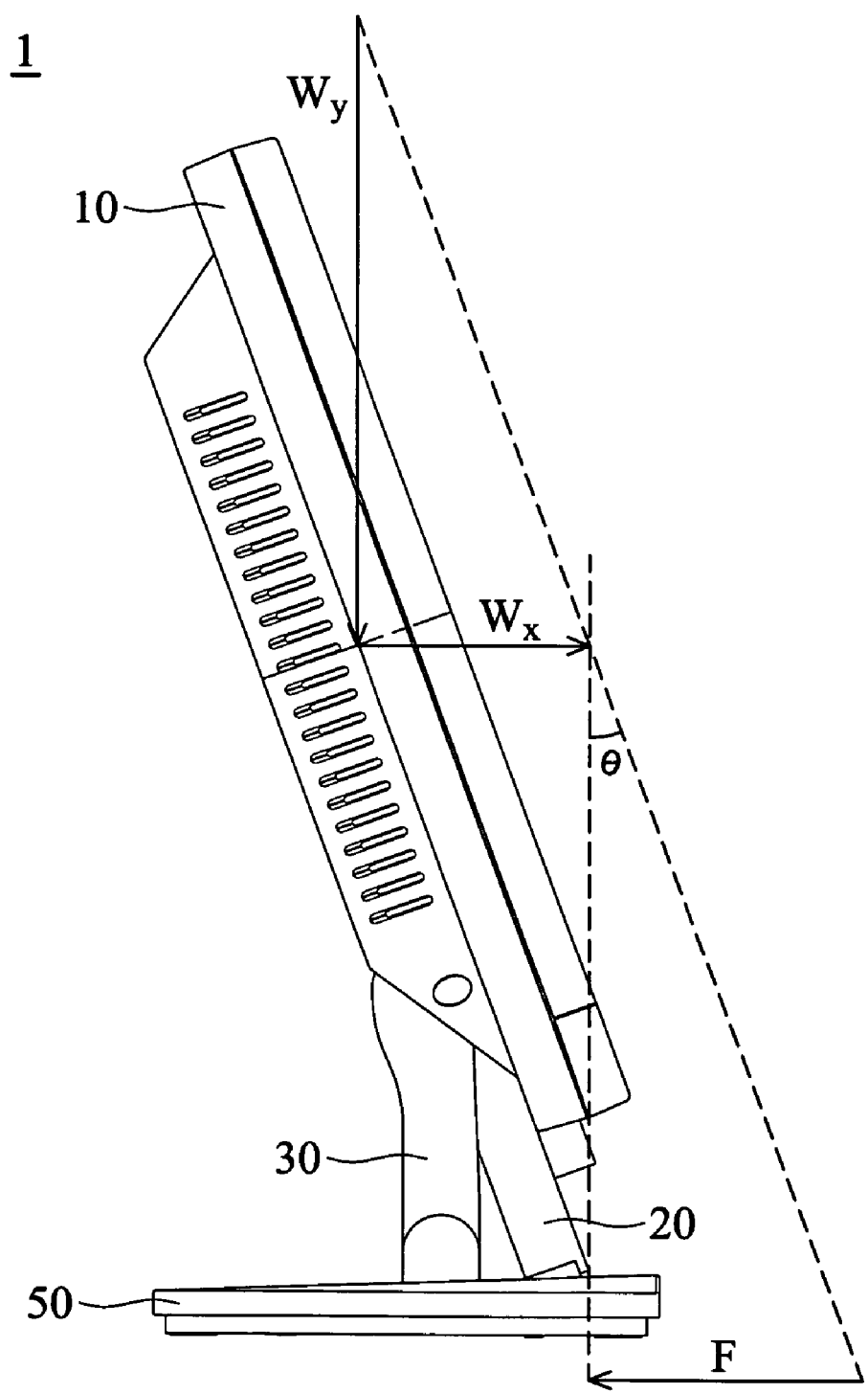
Figure 2C:
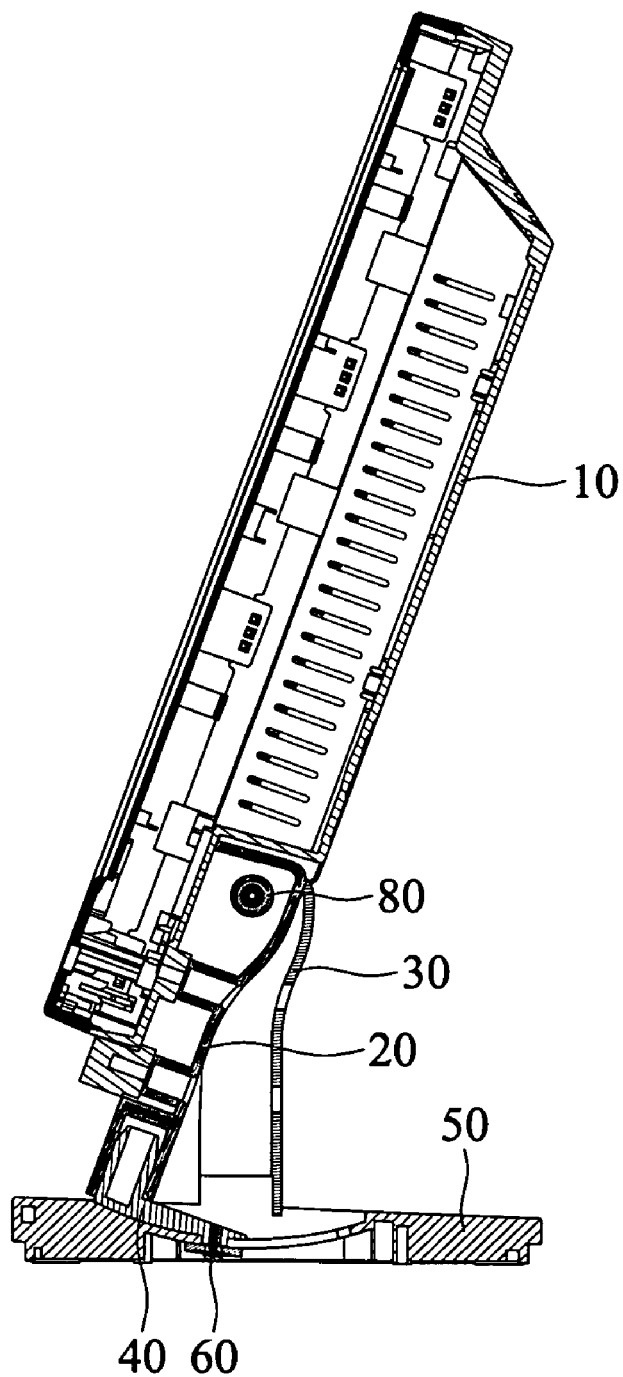

Referring to FIG. 2b, when the body 10 is inclined to a predetermined angle (θ), gravity ($W_y$) in the vertical direction and a component of force ($W_x$) in the horizontal direction are generated. The base 50 and the support 30 may directly sustain the gravity ($W_y$) while the friction member 40 may provide friction (F), exceeding the force ($W_x$), to fix the body 10 at the predetermined angle (θ).

As previously described, an embodiment of the electronic device comprises the friction member and corresponding members to provide the friction replacing the torque of the conventional hinge. Thus, assembly may be easier, and cost may be decreased. Furthermore, when a force exceeding the friction is applied on the body, the body may be easily adjusted to the predetermined angle.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A support mechanism, for supporting an object, comprising:
a base comprising a second circular arc structure;
a support having a top end and a bottom end, the bottom end fixed to the base, and the top end spaced apart from the base;
a rotatable member fixed to the object and rotatably connected with the top end of the support; and
a friction member fixed to the rotatable member, having a first circular arc surface corresponding to the second circular arc structure, the first circular arc surface slidably abuts a top surface of the second circular arc structure;
wherein when the object and the rotatable member receiving an external force less than a friction generated by the first circular arc surface abutting the top surface of the second circular arc structure, the object and the rotatable member are kept still;
wherein when the object and the rotatable member receiving an external force exceeding the friction, the object and the rotatable member rotate relative to the top end.

2. The support mechanism as claimed in claim 1, further comprising a combining member slidably abuts a bottom surface of the second circular arc structure for pressing the base toward the friction member so that the first circular arc surface closely abuts the top surface of the second circular arc structure.

3. The support mechanism as claimed in claim 2, further comprising a pad located between the combining member and the bottom surface of the second circular arc structure.

4. The support mechanism as claimed in claim 2, wherein the combining member is a screw passing through the base to be combined with the friction member.

5. The support mechanism as claimed in claim 4, wherein the base comprises a slot dimensioned to receive the screw, when the object and the rotatable member rotate relative to the top end, the screw moves within the slot.

6. The support mechanism as claimed in claim 1, further comprising a rotary shaft combining the support and the rotatable member.

7. The support mechanism as claimed in claim 6, wherein the rotatable member comprises a first through hole, the support comprises a second through hole corresponding to the first through hole, and the rotary shaft passes through the first through hole and the second through hole.

8. The support mechanism as claimed in claim 1, wherein the rotatable member comprises a hollow portion, and the friction member comprises a protrusion inserted into the hollow portion to combine the rotatable member and the friction member.

9. The support mechanism as claimed in claim 1, wherein the top end of the support being higher than a lower end of the object, and a portion of the object rotates below the top end of the support.

10. An electronic device comprising:
a body;
a base comprising a second circular arc structure;
a support having a top end and a bottom end, the bottom end fixed to the base, and the top end spaced apart from the base;
a rotatable member fixed to the body and rotatably connected with the top end of the support; and
a friction member, fixed to the rotatable member, having a first circular arc surface corresponding to the second circular arc structure, the first circular arc surface slidably abuts a top surface of the second circular arc structure;
wherein when the body and the rotatable member receiving an external force less than a friction generated by the first circular arc surface abutting the top surface of the second circular arc structure, the body and the rotatable member are kept still;

wherein when the body and the rotatable member receiving an external force exceeding the friction, the body and the rotatable member rotate relative to the top end.

11. The electronic device as claimed in claim 10, further comprising a combining member slidably abuts a bottom surface of the second circular arc structure for pressing the base toward the friction member so that the first circular arc surface closely abuts the top surface of the second circular arc structure.

12. The electronic device as claimed in claim 11, further comprising a pad located between the combining member and the bottom surface of the second circular arc structure.

13. The electronic device as claimed in claim 11, wherein the combining member is a screw passing through the base to be combined with the friction member.

14. The electronic device as claimed in claim 13, wherein the base comprises a slot dimensioned to receive the screw, when the body and the rotatable member rotate relative to the top end, the screw moves within the slot.

15. The electronic device as claimed in claim 10, further comprising a rotary shaft combining the support and the rotatable member.

16. The electronic device as claimed in claim 15, wherein the rotatable member comprises a first through hole, the support comprises a second through hole corresponding to the first through hole, and the rotary shaft passes through the first through hole and the second through hole.

17. The electronic device as claimed in claim 10, wherein the rotatable member comprises a hollow portion, and the friction member comprises a protrusion inserted into the hollow portion to combine the rotatable member and the friction member.

18. The electronic device as claimed in claim 10, wherein the rotatable member and the body are integrally formed into a single piece.

19. The electronic device as claimed in claim 10, wherein the top end of the support being higher than a lower end of the body, and a portion of the body rotates below the top end of the support.

20. The electronic device as claimed in claim 10, wherein the electronic device is a display, and the body is a screen.

* * * * *